(12) United States Patent
Trautenberg et al.

(10) Patent No.: US 8,044,858 B2
(45) Date of Patent: Oct. 25, 2011

(54) REGIONAL NAVIGATION SATELLITE SUPPLEMENTARY SYSTEM

(75) Inventors: Hans L. Trautenberg, Ottobrunn (DE); Thomas Weber, Strasslach-Dingharting (DE)

(73) Assignee: Astrium GmbH, Munich (DE)

( * ) Notice: Subject to any disclaimer, the term of this patent is extended or adjusted under 35 U.S.C. 154(b) by 369 days.

(21) Appl. No.: 12/203,589

(22) Filed: Sep. 3, 2008

(65) Prior Publication Data
US 2009/0058721 A1  Mar. 5, 2009

(30) Foreign Application Priority Data
Sep. 4, 2007  (DE) .................. 10 2007 041 773

(51) Int. Cl.
G01S 1/08 (2006.01)
G01S 19/48 (2006.01)
G01S 19/05 (2006.01)
G01C 21/00 (2006.01)

(52) U.S. Cl. .............. 342/386; 342/357.31; 342/357.42; 701/213

(58) Field of Classification Search ............. 342/357.02, 342/357.06, 357.09, 386, 357.21, 357.31, 342/357.42, 357.63; 701/207, 213
See application file for complete search history.

(56) References Cited

U.S. PATENT DOCUMENTS

| | | | |
|---|---|---|---|
| 2002/0101374 A1* | 8/2002 | Mutoh et al. | 342/357.09 |
| 2004/0145517 A1 | 7/2004 | Kinal et al. | |
| 2005/0090265 A1 | 4/2005 | Abraham | |
| 2005/0157672 A1 | 7/2005 | Dodel | |
| 2007/0109186 A1* | 5/2007 | Fujiwara et al. | 342/357.09 |
| 2009/0013210 A1* | 1/2009 | McIntosh et al. | 714/4 |

FOREIGN PATENT DOCUMENTS

| | | |
|---|---|---|
| DE | 103 56 580 A1 | 7/2005 |
| WO | WO 99/18677 A1 | 4/1999 |

OTHER PUBLICATIONS

European Search Report dated Nov. 6, 2008 with partial English translation (Nine (9) pages).
Esa, "Galileo: Road Applications", (Internet Article), The European Programme for Global Navigation Services, Oct. 2002, pp. 1-2, European Commission, XP-002501351.
Esa, "Galileo: Mission High Level Definition", (Internet Article), Sep. 23, 2002, pp. 1-48, European Commission, XP-002501418.
Steciw, A. et al., "A European Satellite Navigation Programme", IEE Colloquium on Implementation of GNSS, 1995, London.
German Office Action dated Jun. 2, 2008 including English translation of the relevant portion (Five (5) pages).

* cited by examiner

*Primary Examiner* — Dao Phan
(74) *Attorney, Agent, or Firm* — Crowell & Moring LLP

(57) ABSTRACT

A device of a supplementary navigation satellite is provided. The device includes a unit for generating navigation signals, the signal strength of the navigation signals being dimensioned in such a way that it is still possible to receive signals of other satellite navigation systems.

12 Claims, 3 Drawing Sheets

---

310 — Dimension the signal strength of the navigation signals in such a way that it is still possible to receive signals of other satellite navigation systems 320 — Include navigation-relevant information at a data rate which is significantly above the data rate of the commercial service of Galileo 330 — Transmit signals from supplementary navigation satellite system

REGIONAL NAVIGATION SATELLITE SUPPLEMENTARY SYSTEM

CROSS REFERENCE TO RELATED APPLICATIONS

This application claims priority under 35 U.S.C. §119 to German Patent Application No. 10 2007 041 773.1-35, filed Sep. 4, 2007, the entire disclosure of which is herein expressly incorporated by reference. This application is related to U.S. patent application Ser. No. 12/203,588 entitled Regional Navigation Satellite Supplementary System, the entire disclosure of which is herein expressly incorporated by reference.

BACKGROUND AND SUMMARY OF THE INVENTION

The invention relates to a regional navigation satellite supplementary system.

A navigation system must not only allow positioning of the user with the required precision, continuity, and availability, but also provide the other information necessary for navigation. This other information is typically provided on paper via a map, on a storage media, via traffic radio messages, which are also distributed in digital form.

The street grid maps used in the navigation systems are usually fixed and typically require user interaction to obtain regular updates. Using known techniques, information about current or future traffic obstructions is available only on the local or regional level (if at all), and interregional information (which is also significant for planning longer trips) is typically not easily available. Accordingly, conventional systems do not necessarily provide selective detour recommendation that account for new traffic obstructions that could arise due to bypass recommendations.

Exemplary embodiments of the present invention provide devices and methods which allow traffic obstructions to be bypassed. This allows the street infrastructure to be used significantly more effectively because traffic obstructions may be bypassed. Moreover, the present invention significantly reduces the effort that a user must expend to have current planning documents for his trips.

In accordance with exemplary embodiments of the present invention, the navigation satellites of the navigation satellite supplementary system which are located over an area in which a service is to be provided are located close to the zenith and transmit a relatively strong navigation signal into the service area. For example, these satellites may fly on suitable geosynchronous orbits, on geosynchronous orbits in or near the equatorial level, or also on so-called Molniya orbits.

These satellites are then implemented as controllable using a (vertically) oriented antenna, to achieve the highest possible signal strength in the service area with the least possible power consumption, the signal strength being dimensioned in such a way that the signals of other satellite navigation systems may still be received. This is achieved, inter alia, by a suitable selection of the coding of the signals.

The signals transmit navigation-relevant information at a data rate which is significantly above the data rate of the commercial service of Galileo. This information contains, inter alia, current and expected traffic obstructions in the service area, recommendations for how specific user groups having various travel directions and travel destinations (which may be regionally combined) are to drive around these traffic obstructions, changes of the street grid in the service area, and also comprise expected traffic obstructions due to environmental influences, chronologically recent changes being repeated relatively frequently and chronologically earlier changes being repeated relatively rarely (which may be no repetition at all). The invention also discloses arbitrary combinations of the above-mentioned navigation-relevant information.

Exemplary embodiments of the present invention include a method for transmitting a navigation signal that involves generating navigation signals, wherein the signal strength of the navigation signals is dimensioned in such a way that it is still possible to receive signals of other satellite navigation systems, and wherein the signals transmit navigation-relevant information at a data rate which is significantly above the data rate of the Galileo satellite system; and transmitting the generated navigation signals.

The features specified in connection with the embodiments of the device of the invention are also disclosed for the method.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
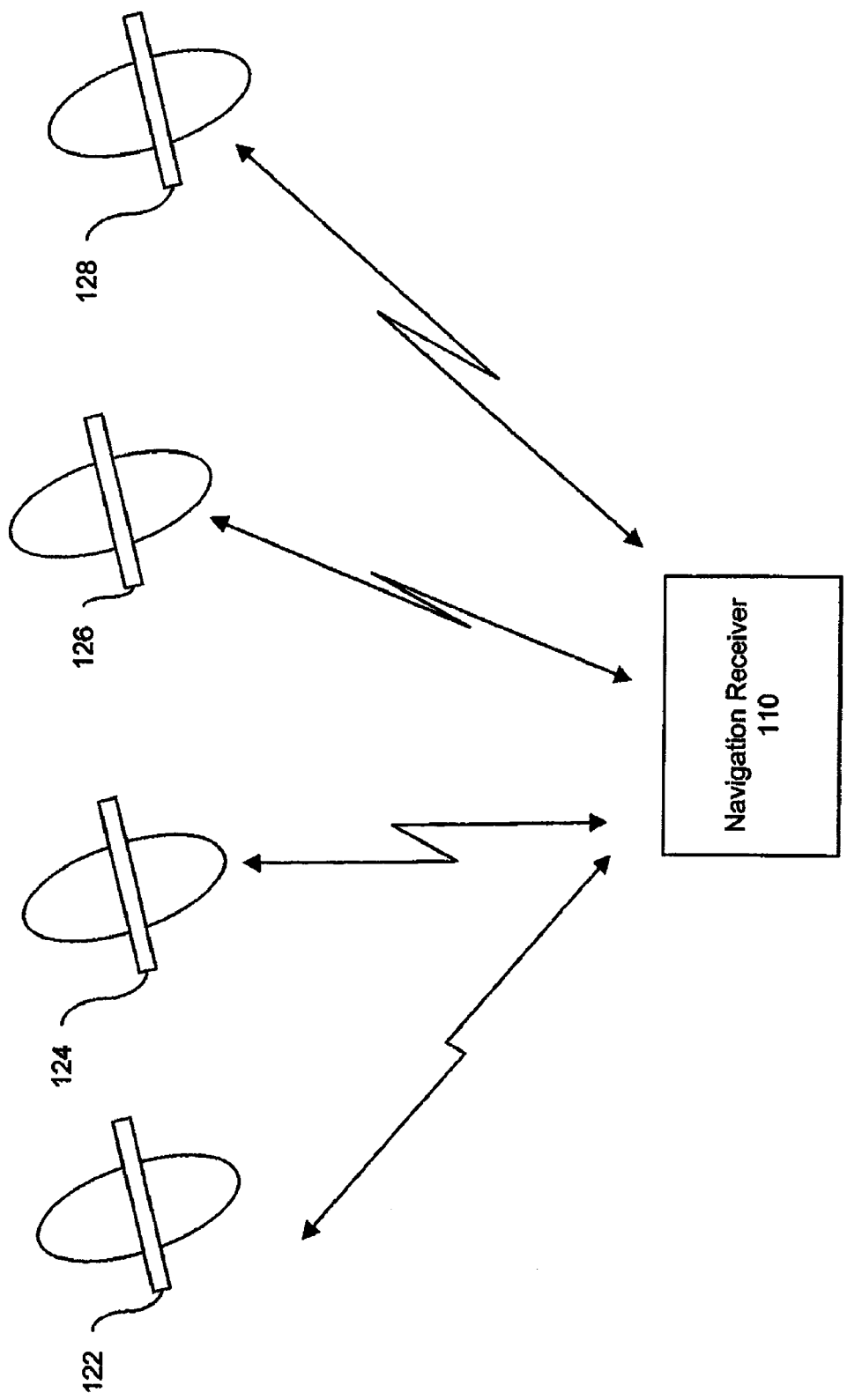
FIG. 1 is a block diagram of an exemplary system in accordance with the present invention.

FIG. 1 is a block diagram of an exemplary system in accordance with the present invention. The system includes a satellite positioning system that comprises a plurality of satellites 122-126 and a supplementary satellite positioning system comprising one or more satellites 128. A navigation receiver 110 can determine its position using signals received from satellites 122-128, and can also receive navigation-relevant information from satellite 128 as described in more detail herein. Although FIG. 1 illustrates a particular number of satellites for the positioning system and the supplementary system, the present invention can include more satellites than those illustrated.

Figure 2:
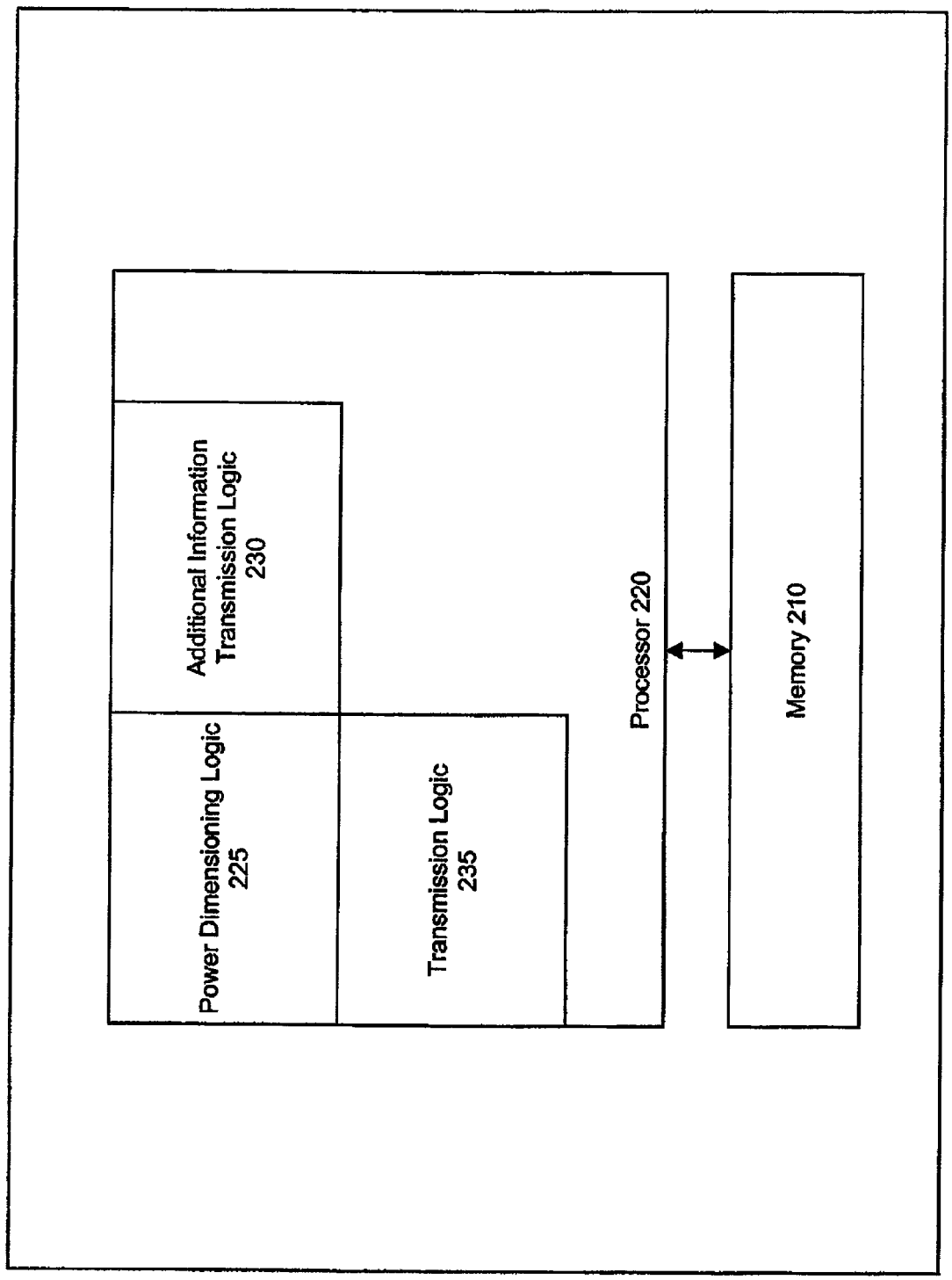
FIG. 2 is a block diagram of an exemplary device of a satellite positioning supplementary system in accordance with the present invention.

FIG. 2 is a block diagram of an exemplary device of a satellite positioning supplementary system in accordance with the present invention. The device includes memory 210 coupled to processor 220. Processor 220 includes power dimensioning logic 225, additional information transmission logic 230 and transmission control logic 235, which will be described in more detail in connection with FIG. 3. Processor 220 can be any type of processor including a field programmable gate array (FPGA), application specific integrated circuit (ASIC) and/or a microprocessor. When processor 220 is a microprocessor, logic 225-235 can be processor-executable instructions loaded from memory 210.

Figure 3:
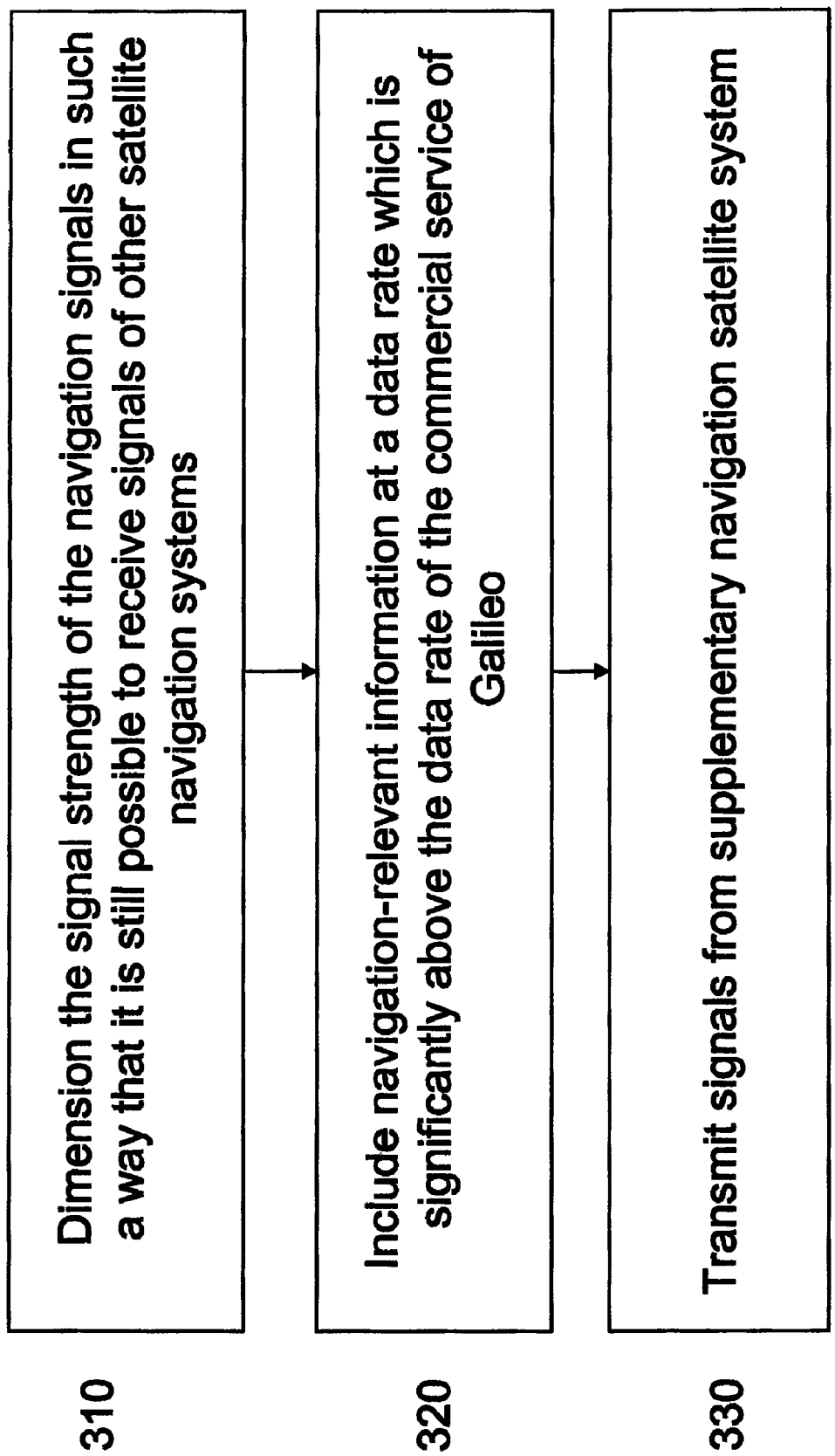
FIG. 3 is a flow diagram of an exemplary method in accordance with the present invention.

FIG. 3 is a flow diagram of an exemplary method in accordance with the present invention. Initially, in step 310, logic 225 dimensions the signal strength of the navigation signals in such a way that it is still possible to receive signals of other satellite navigation systems. This can be performed using any of the techniques disclosed in U.S. Patent Application Ser. No. 12/203,588 entitled Regional Navigation Satellite Supplementary System, the entire disclosure of which is herein expressly incorporated by reference.

In step 320, logic 230 includes navigation-relevant information at a data rate which is significantly above the data rate of the commercial service of Galileo. The navigation-relevant information can include current and expected traffic obstructions in a service area, recommendations for how specific user groups having various travel directions and travel destinations, which may be regionally combined, are to drive around these traffic obstructions, changes of the street grid in the service area, and expected traffic obstructions due to environmental influences. Finally, in step 330, logic 235 transmits signals from supplementary navigation satellite system.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device of a supplementary navigation satellite comprising:
    a unit for generating navigation signals, wherein the signal strength of the navigation signals is dimensioned in such a way that it is still possible to receive signals of other satellite navigation systems, and wherein the signals transmit navigation-relevant information at a data rate which is significantly above the data rate of the Galileo satellite system,
    wherein the navigation-relevant information comprises at least one of current and expected traffic obstructions in a service area, recommendations for how specific user groups having various travel directions and travel destinations, which may be regionally combined, are to drive around these traffic obstructions, changes of the street grid in the service area, and expected traffic obstructions due to environmental influences.

2. The device according to claim 1, wherein the data rate is dimensioned in such a way that a maximum data throughput is achieved under the given environmental influences and the permitted error rate using the available power on the satellite and the possible directive antenna on the satellite.

3. The device according to claim 1, wherein the navigation-relevant information comprises current and expected traffic obstructions in a service area, recommendations for how specific user groups having various travel directions and travel destinations, which may be regionally combined, are to drive around these traffic obstructions, changes of the street grid in the service area, and expected traffic obstructions due to environmental influences.

4. The device according to claim 3, wherein chronologically recent changes are repeated relatively frequently and chronologically earlier changes are repeated relatively rarely.

5. The device according to claim 4, wherein a rare repetition may also be no repetition at all.

6. A method for transmitting a navigation signal comprising:
    generating navigation signals, wherein the signal strength of the navigation signals is dimensioned in such a way that it is still possible to receive signals of other satellite navigation systems, and wherein the signals transmit navigation-relevant information at a data rate which is significantly above the data rate of the Galileo satellite system; and
    transmitting the generated navigation signals,
    wherein the navigation-relevant information comprises at least one of current and expected traffic obstructions in a service area, recommendations for how specific user groups having various travel directions and travel destinations, which may be regionally combined, are to drive around these traffic obstructions, changes of the street grid in the service area, and expected traffic obstructions due to environmental influences.

7. The method according to claim 6, wherein the data rate is dimensioned in such a way that a maximum data throughput is achieved under the given environmental influences and the permitted error rate using the available power on the satellite and the possible directive antenna on the satellite.

8. A method for transmitting a navigation signal comprising:
    generating navigation signals, wherein the signal strength of the navigation signals is dimensioned in such a way that it is still possible to receive signals of other satellite navigation systems, and wherein the signals transmit navigation-relevant information at a data rate which is significantly above the data rate of the Galileo satellite system; and
    transmitting the generated navigation signals, wherein the navigation-relevant information comprises current and expected traffic obstructions in a service area, recommendations for how specific user groups having various travel directions and travel destinations, which may be regionally combined, are to drive around these traffic obstructions, changes of the street grid in the service area, and expected traffic obstructions due to environmental influences.

9. The method according to claim 8, wherein chronologically recent changes are repeated relatively frequently and chronologically earlier changes are repeated relatively rarely.

10. The method according to claim 9, wherein a rare repetition may also be no repetition at all.

11. The method according to claim 6, wherein chronologically recent changes are repeated relatively frequently and chronologically earlier changes are repeated relatively rarely.

12. The method according to claim 11, wherein a rare repetition may also be no repetition at all.

* * * * *